(12) United States Patent
Marini

(10) Patent No.: US 7,694,698 B2
(45) Date of Patent: Apr. 13, 2010

(54) CONTAINER FOR SEALING LIQUID FOR REPAIRING INFLATABLE ARTICLES, IN PARTICULAR TYRES, AND REPAIR KIT FEATURING SUCH A CONTAINER

(76) Inventor: Maurizio Marini, c/o TEK S.r.l. Via degli Abeti, 120, 61100 Pesaro (IT)

( * ) Notice: Subject to any disclaimer, the term of this patent is extended or adjusted under 35 U.S.C. 154(b) by 296 days.

(21) Appl. No.: 10/591,032

(22) PCT Filed: Feb. 22, 2005

(86) PCT No.: PCT/IB2005/000447

§ 371 (c)(1),
(2), (4) Date: Jul. 23, 2007

(87) PCT Pub. No.: WO2005/084968

PCT Pub. Date: Sep. 15, 2005

(65) Prior Publication Data

US 2008/0092984 A1    Apr. 24, 2008

(30) Foreign Application Priority Data

Feb. 27, 2004   (IT)   .......................... TO2004A0121

(51) Int. Cl.
*B65B 1/04*     (2006.01)
(52) U.S. Cl. .................. 141/38; 152/415; 222/394
(58) Field of Classification Search ............. 141/38, 141/41, 98, 100; 152/415; 222/394
See application file for complete search history.

(56) References Cited

U.S. PATENT DOCUMENTS

| | | | | |
|---|---|---|---|---|
| 4,765,367 A | * | 8/1988 | Scott ........................... 141/38 |
| 5,070,917 A | * | 12/1991 | Ferris et al. .................... 141/38 |
| 5,887,762 A | * | 3/1999 | Hanna ...................... 222/321.7 |
| 5,908,145 A | * | 6/1999 | Jaksa .......................... 141/38 |
| 6,019,145 A | * | 2/2000 | Savidge ....................... 141/38 |
| 6,176,285 B1 | * | 1/2001 | Gerresheim et al. ......... 152/509 |
| 6,283,172 B1 | * | 9/2001 | Thurner ....................... 141/38 |
| 6,345,650 B1 | * | 2/2002 | Paasch et al. ................. 141/38 |
| 6,412,524 B1 | * | 7/2002 | Fogal, Sr. .................... 141/38 |
| 6,736,170 B2 | * | 5/2004 | Eriksen et al. ................ 141/38 |
| 6,766,834 B1 | * | 7/2004 | Eckhardt ...................... 141/38 |
| 6,789,581 B2 | * | 9/2004 | Cowan et al. ................. 141/38 |
| 6,889,723 B2 | * | 5/2005 | Gerresheim et al. ........... 141/38 |
| 6,964,284 B2 | * | 11/2005 | Eckhardt ...................... 141/38 |
| 6,968,869 B2 | * | 11/2005 | Eckhardt ...................... 141/38 |
| 7,021,348 B2 | * | 4/2006 | Eriksen et al. ................ 141/38 |
| 7,028,720 B2 | * | 4/2006 | Eckhardt ...................... 141/38 |
| 2002/0112777 A1 | * | 8/2002 | Fang et al. .................... 141/38 |
| 2003/0056851 A1 | * | 3/2003 | Eriksen et al. ................ 141/38 |
| 2004/0173282 A1 | * | 9/2004 | Laetgaard ..................... 141/38 |

* cited by examiner

*Primary Examiner*—Gregory L Huson
*Assistant Examiner*—Nicolas A Arnett

(57) ABSTRACT

A container for sealing liquid for repairing inflatable articles, in particular, tyres, has a vessel having an opening; and a valve device fitted to the opening and having an inlet connectable to a compressed-air feed line, and an outlet for dispensing the sealing liquid; the valve device has a slide movable, in response to pressurization of the feed line, from a closed position closing the valve device and wherein the inlet and outlet are isolated from the inside of the container, to an open position wherein the inlet and outlet communicate with the inside of the container.

10 Claims, 3 Drawing Sheets

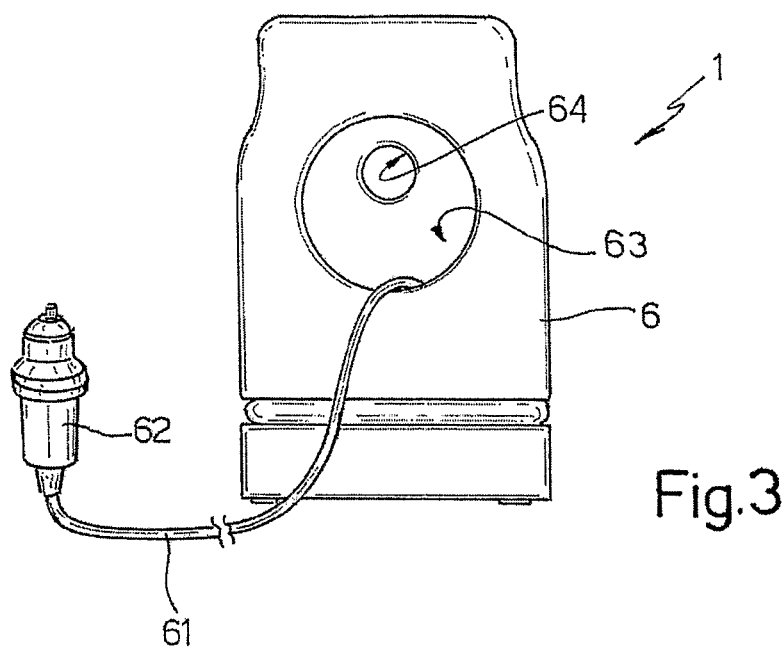
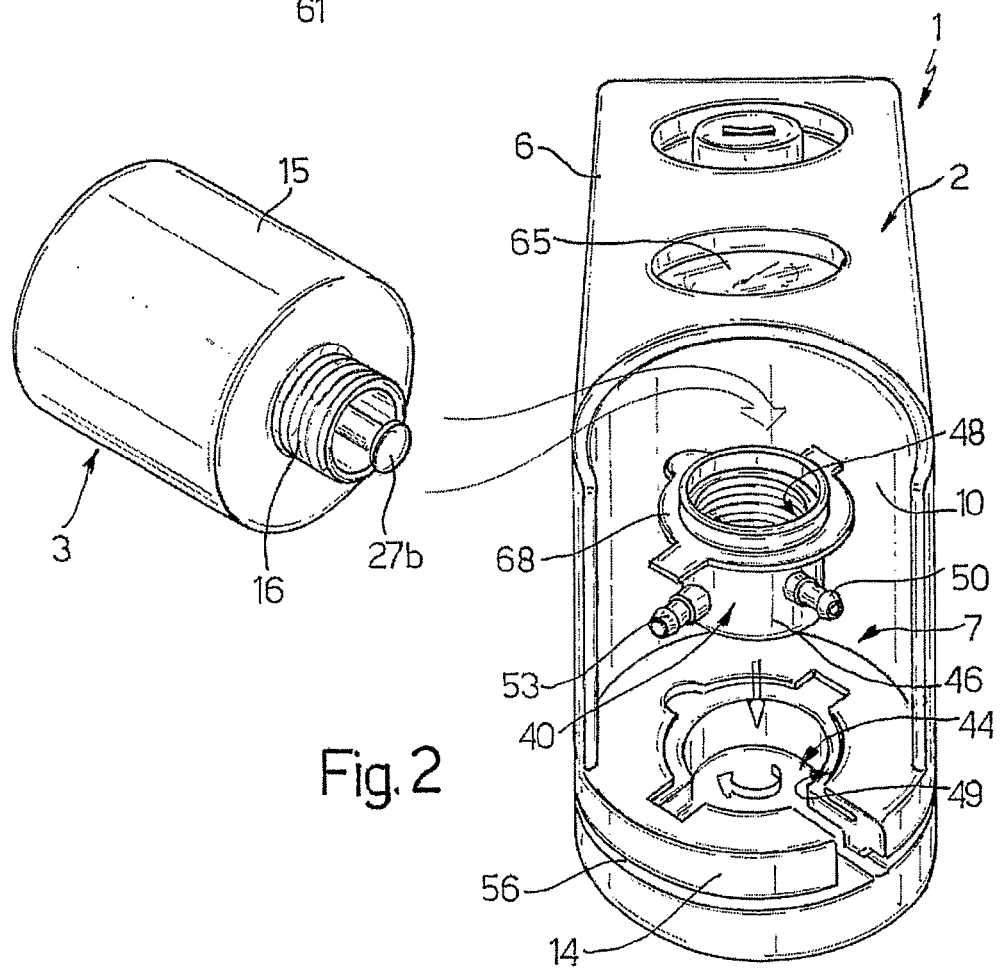

CONTAINER FOR SEALING LIQUID FOR REPAIRING INFLATABLE ARTICLES, IN PARTICULAR TYRES, AND REPAIR KIT FEATURING SUCH A CONTAINER

TECHNICAL FIELD

The present invention relates to a container for sealing liquid for repairing inflatable articles, in particular tyres, and to a repair kit featuring such a container.

BACKGROUND ART

Sealing fluids for fast repair of inflatable articles are known, can be fed into the article for repair by means of compressed air, e.g. using a compressor, penetrate inside any holes or slits in the article, and set upon contact with air, thus rapidly sealing the article.

Such liquids are widely used for fast tyre repair, to which the following description refers for the sake of clarity and purely by way of example.

Vehicle spare wheels pose a number of well-known problems, not least of which are their considerable size and weight.

More specifically, if the wheel is housed inside the vehicle, normally in a compartment to the side of or beneath the boot, the capacity of the boot is greatly reduced, and the tyre is difficult to remove, especially when the boot is full.

Conversely, if stowed outside the vehicle, normally in a compartment beneath the floor, or attached to the rear door, the wheel can easily be stolen and is still not easy to remove.

Given the good road conditions in most countries, punctures are now rare, so that changing a wheel can prove extremely difficult, if not impossible, on account of the bolts being locked tight, and in any case is awkward by being performed in critical conditions (traffic, poor lighting, bad weather). Considerable advantage is to be gained, therefore, by replacing the spare wheel with a repair and inflation kit comprising a small compressor and a container of sealing liquid, which can be stowed easily in a special compartment or in the boot of the car.

In addition to the big reduction in size and weight, puncture repair is also made faster and easier: as opposed to changing the wheel, the compressor is simply connected to a current outlet on the vehicle, the container of sealing liquid is connected to the compressor and to the valve of the tyre for repair, and the compressor is started to feed the liquid into the tyre. For this purpose, the container normally has a dispenser unit comprising an inlet conduit and an outlet conduit connected respectively, by respective conduits, to the compressor and the valve of the tyre for repair.

In one known solution, the container is fitted permanently to the dispenser unit, which incorporates a sealing device. The container, in itself open, is therefore undetachable from the dispenser unit.

A major drawback of this solution is that, after use or when the use-by date of the sealing liquid expires, both the container and the dispenser unit must be replaced, thus increasing cost.

In another known solution, the container itself is sealed, e.g. by a sealing membrane, which is split when the container is fitted to the dispenser unit. This means the container must be fitted to the dispenser unit just prior to use, which constitutes an undesirable additional operation.

DISCLOSURE OF INVENTION

It is an object of the present invention to provide a container for sealing liquid for repairing inflatable articles, designed to eliminate the aforementioned drawbacks typically associated with known containers.

According to the present invention, there is provided a container for sealing liquid for repairing inflatable articles, in particular, tyres, and comprising a vessel having an opening, and on-off means fitted to said opening; characterized in that said on-off means comprise a valve device having an inlet connectable to a compressed-air feed line, and an outlet for dispensing the sealing liquid; said valve device comprising at least one control member movable, in response to pressurization of said feed line, from a closed position closing said valve device and wherein said inlet and said outlet are isolated from the inside of said container, to an open position wherein said inlet and said outlet communicate with the inside of said container.

BRIEF DESCRIPTION OF THE DRAWINGS

A preferred, non-limiting embodiment of the present invention will be described by way of example with reference to the accompanying drawings, in which:

FIG. 2 shows a partly disassembled view in perspective of the FIG. 1 kit;

FIGS. 3 and 4 show a rear view and underside view in perspective respectively of the FIG. 1 kit partly disassembled;

BEST MODE FOR CARRYING OUT THE INVENTION

Figure 1:
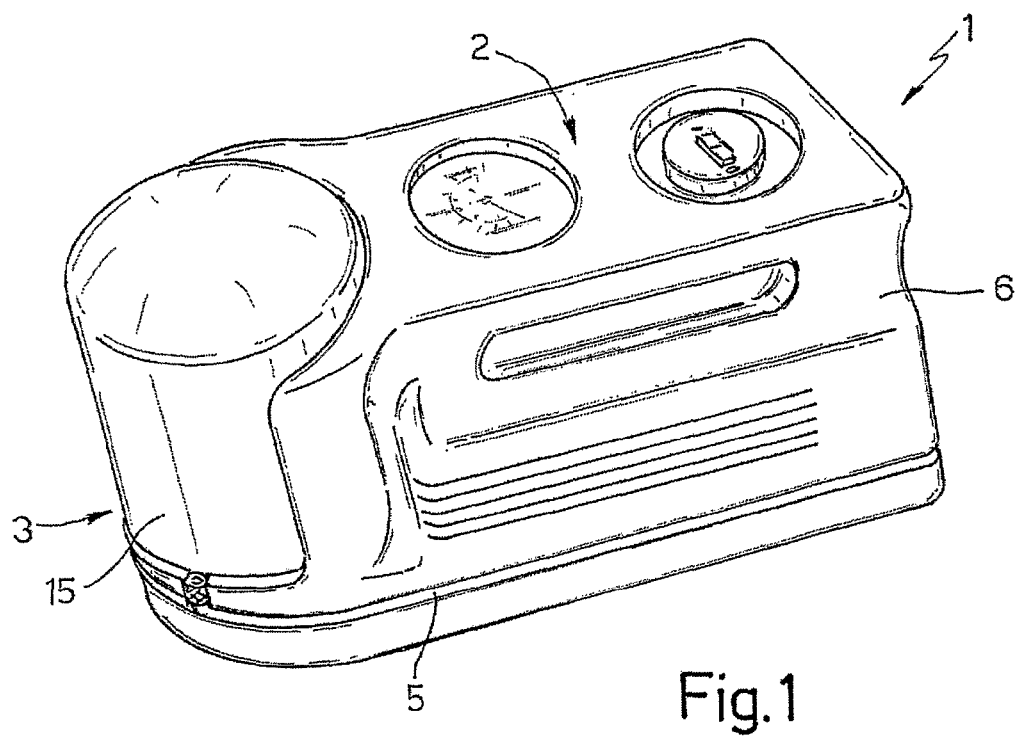
FIG. 1 shows a view in perspective of a repair kit comprising a sealing liquid container in accordance with the present invention.
Figure 4:
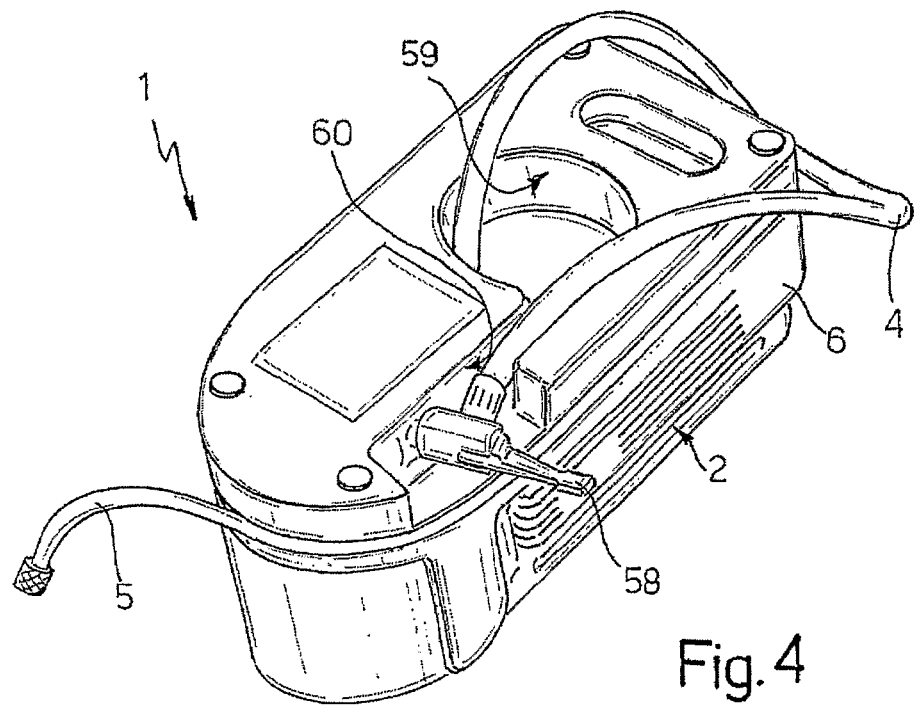

Number 1 in FIGS. 1 to 4 indicates as a whole a kit for fast repair of inflatable articles, in particular, tyres.

Kit 1 substantially comprises an electric compressor assembly 2; a container 3 of sealing liquid; a first hose 4 connecting container 3 to compressor assembly 2; and a second hose 5 connecting container 3 to a valve (not shown) of the tyre.

In known manner not shown, compressor assembly 2 comprises an electric motor and a compressor-powered by the electric motor—which are housed inside an outer casing 6.

Casing 6 is substantially parallelepiped-shaped and, at one longitudinal end, defines a seat 7 for housing container 3 upside down. More specifically, seat 7 is bounded laterally by a substantially semicylindrical end wall 10 of casing 6, and at the bottom by a circular base 14 projecting from end wall 10.

Container 3 comprises a vessel 15, preferably in the form of a bottle, containing the sealing liquid and having an externally threaded neck 16 defining an opening 17 (FIGS. 5 and 6); and a valve device 18 housed in opening 17. Valve device 18 forms an integral part of container 3, to ensure the container is closed fluidtight when detached from the rest of kit 1, as explained in detail below.

Valve device 18 comprises a body 19 having a cylindrical lateral wall 20, of axis A, inserted in fluidtight manner inside neck 16, and a portion 20a of which extends beyond neck 16, into vessel 15, and is closed at one end by an end wall 21.

Portion 20a has two circumferential series of holes 24, 25 communicating with the inside of vessel 15, spaced axially apart, and located close to end wall 21 and close to neck 16 respectively.

Body 19 of valve device 18 also comprises an inner member 26 defined by a tubular rod 27 of axis A, and by a supporting ring 28 fixed inside an open end of body 19 and connected integrally to tubular rod 27 by a number of spokes 29 forming a number of axial passages 29a.

Rod 27 has a first end portion 27a close to end wall 21, and a conveniently flanged second end portion 27b projecting axially outwards of body 19, and defines internally an axial passage 27c.

Valve device 18 comprises a tubular slide 30, which slides axially inside the annular chamber 36 formed between body 19 and rod 27. Slide 30 is maintained in an axial stop position against end wall 21 by a helical spring 31 compressed axially between slide 30 and supporting ring 28.

Slide 30 has a circumferential series of holes 32 formed at an outer annular groove 33 dividing the slide into two portions 37, 38. Slide 30 also comprises two pairs of outer, axially spaced sealing rings (O-rings) 34a, 34b and 35a, 35b, which are housed in respective annular seats and form a sliding seal between slide 30 and body 19. The two pairs of O-rings 34a, 34b and 35a, 35b are located on axially opposite sides of holes 32. More specifically, O-rings 34a, 34b are carried by portion 37 facing end wall 21, and O-rings 35a, 35b are carried by portion 38 facing end portion 27b of rod 27. In said axial stop position of slide 30, O-ring 34a is located between holes 24 and end wall 21; O-ring 34b is located between holes 24 and holes 32; O-ring 35a is located between holes 25 and holes 32; and O-ring 35b is located on the axially opposite side of holes 25 to O-ring 35a.

Portion 37 of slide 30 slides in fluidtight manner on rod 27, preferably with the interposition of an O-ring 38a on rod 27. Portion 38 of slide 30 is larger in inside diameter than rod 27, and defines with rod 27 a chamber 39 open towards the flanged end portion 27b of rod 27 and communicating with holes 32.

Figure 5:
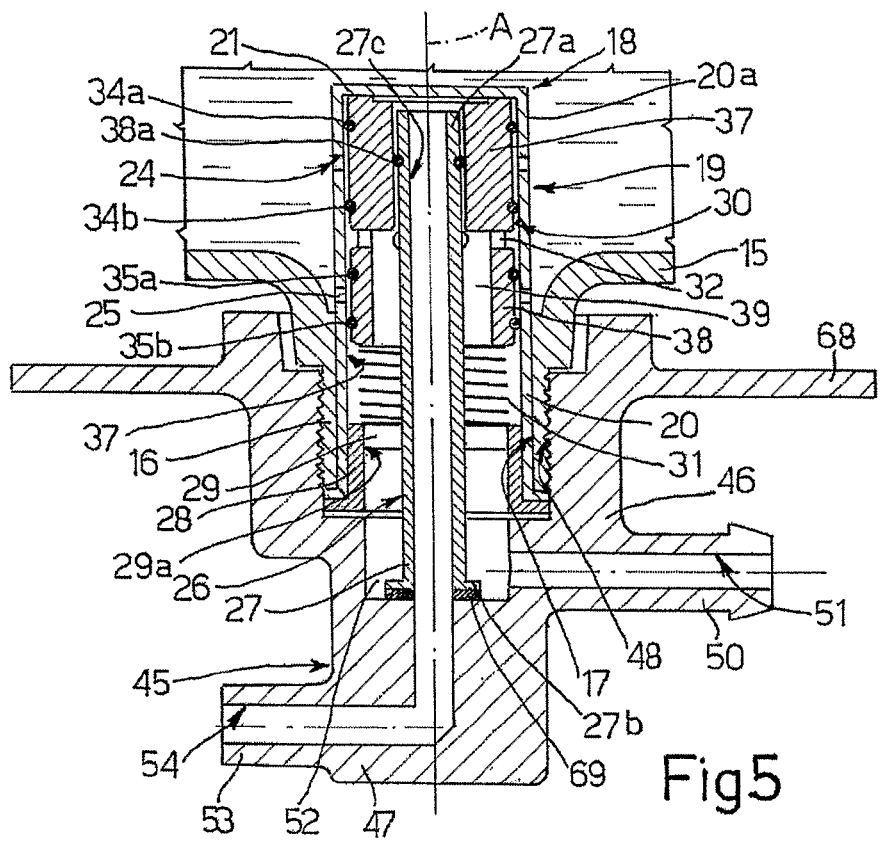
FIGS. 5 and 6 show sections, along line V-V in FIG. 2, of the container and a dispenser unit of the FIG. 2 kit assembled together.
Figure 6:
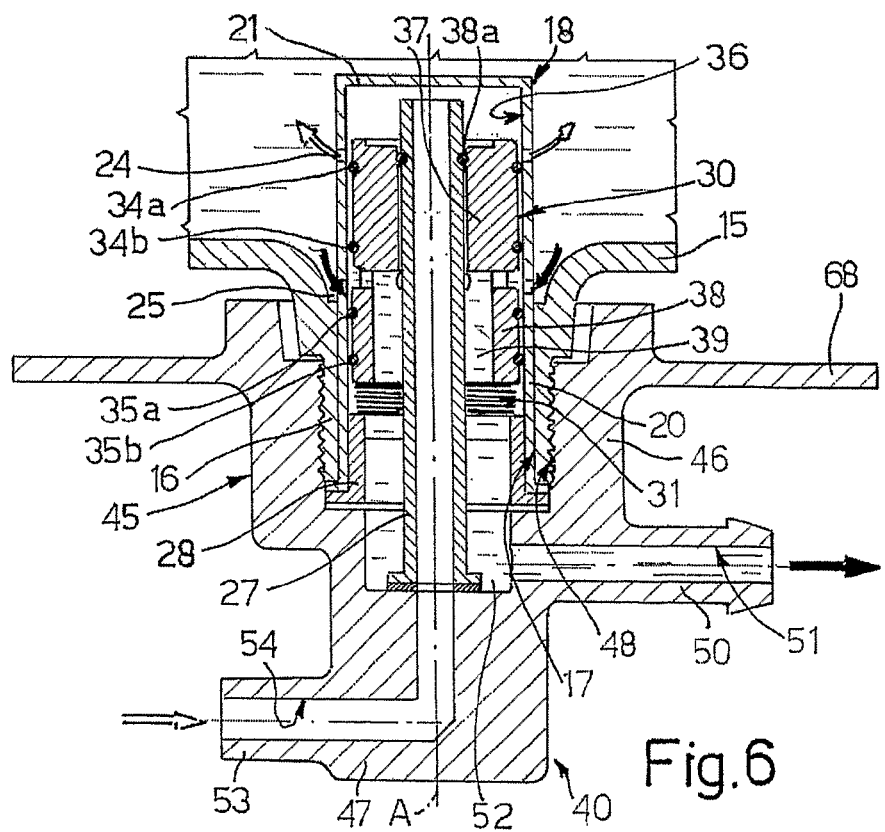

Kit 1 also comprises a dispenser unit 40, which is housed stably but detachably inside a recess 44 in base 14 of casing 6, and is connected detachably to container 3 to fit it, upside down, to casing 6 (FIGS. 1, 5 and 6).

More specifically, dispenser unit 40 substantially comprises a plug-like central portion 45 having a substantially cylindrical lateral wall 46 and an end wall 47, which define an internally threaded cavity 48 into which neck 16 of vessel 15 is screwed; and a circular flange 68 extending radially from central portion 45 and defining a bayonet connection with corresponding fastening means 49 in base 14 of casing 6.

Dispenser unit 40 also comprises a first tubular fitting 50 projecting radially from central portion 45 and defining a conduit 51 communicating with and radial with respect to a bottom portion 52 of cavity 48; and a substantially pipe-like second tubular fitting 53 projecting radially, close to end wall 47 of central portion 45, in a radial direction perpendicular to that of first tubular fitting 50. Second tubular fitting 53 defines a conduit 54 communicating coaxially with bottom portion 52 of cavity 48.

When container 3 is screwed into dispenser unit 40, end portion 27b of tubular rod 27—possibly fitted with an annular sealing member 69 on the end—cooperates in fluidtight manner with end wall 47 of central portion 45, so that the internal axial passage 27c of rod 27 communicates with and substantially constitutes an extension of conduit 54 (FIGS. 5 and 6).

Base 14 has lateral openings (one shown in FIG. 4) through which fittings 50, 53 are accessible from outside casing 6, once dispenser unit 40 is bayonet connected inside recess 44 in base 14, e.g. by rotating it 45° with respect to the FIG. 2 insertion position.

First fitting 50 is connected to hose 5, which, when not in use, may be wound about the casing and housed inside a peripheral groove 56 in the casing; and second fitting 53 is connected to compressor 2 by hose 4. Conveniently, hose 4 is longer than required for connection to fitting 53, and is fitted on its free end with a fast-fit, e.g. lever-operated, coupling 58. Hose 4 is therefore normally connected to second fitting 53, but can be detached easily and connected directly to the article, e.g. a tyre, ball, dinghy, etc., if this simply needs inflating and not repair. Hose 4 is normally stowed almost entirely inside a seat 59 formed on the underside of casing 6, from which it extends along an underside groove 60 housing the end portion of hose 4 fitted with coupling 58.

Second fitting 53 is located at a different height from first fitting 50, so as to avoid any interference with hose 5 wound about casing 6.

Compressor assembly 2 has an electric power cable 61 fitted on the end with a connector 62 for connection to a current outlet on the vehicle. Cable 61 is normally housed in a seat 63 formed in a portion of casing 6 opposite seat 7 for container 3, and connector 62 is stowed inside a cavity 64 in seat 63. Compressor assembly 2 is conveniently provided with a gauge 65 and a switch 66.

Kit 1 and particularly container 3 operate as follows.

Kit 1 is an integrated preassembled unit, which is supplied ready for use as shown in FIG. 1.

To repair an inflatable article, e.g. a tyre, hose 5 is simply connected to the tyre valve, and compressor assembly 2 activated.

The air pressure along hose 4, fitting 50, and internal passage 27c of rod 27, is transmitted to the end of annular chamber 36, and exerts thrust on the end surface of slide 30 adjacent to end wall 21.

Slide 30 therefore moves, in opposition to spring 31, from the FIG. 5 rest position to the FIG. 6 position, in which O-rings 34a, 34b are interposed between holes 24 and holes 25, and O-ring 35a has moved past holes 25, so that holes 32 in slide 30 communicate with holes 25. Compressed air therefore flows through holes 24 into container 3, which is therefore pressurized, so that sealing liquid flows through holes 25 and holes 32 into chamber 39 in slide 30, and is fed along fitting 50 and hose 5 to the tyre.

Device 18 therefore acts as a two-way, two-position, pneumatic valve. In the closed position (FIG. 5), the container is sealed; with pressure along the feed line defined by hose 4, device 18 opens automatically to allow compressed air into container 3, and simultaneous outflow of sealing liquid.

After use, the component parts coming into contact with the sealing liquid, in particular dispenser unit 40 and hose 5, may be washed with water and used again.

Given the characteristics of kit 1, and particularly container 3, according to the present invention, the advantages of the present invention will be clear from the foregoing description.

Firstly, container 3, having an integrated valve device 18, constitutes an independent sealed unit regardless of whether or not it is connected to dispenser unit 40.

After use, or when the sealing liquid use-by date expires (normally after a few years), only container 3 therefore need be replaced. That is, dispenser unit 40 need not be replaced, and may be left permanently inside casing 6.

Using a two-way valve device 18 closed stably in the absence of pressure along the feed line defined by hose 4, sealing liquid leakage is prevented, even in abnormal conditions, such as overpressure in container 3 caused by high temperature inside the boot of a car parked in the sun.

Unit 40 is preferably detachable, and can therefore be removed and washed after use, together with hose 5, to remove any residual sealing liquid which might prevent it being used again.

Using a valve device 18, container 3 is ready for use at all times, i.e. fitted permanently to kit 1. Container 3, in fact, is sealed but operated immediately in response to turning on the compressor.

As such, no preliminaries, such as fitting the container to dispenser unit 40, are required.

Kit 1 constitutes a compact, lightweight unit, which can be stowed easily ready for use.

Clearly, changes may be made to container 3 as described herein without, however, departing from the scope of the accompanying Claims.

In particular, valve device 18 may differ, providing it has an air inlet and sealing liquid outlet, which are kept isolated inside the container, regardless of whether the container is fitted inside the kit or stowed as a spare, and which are only connected to the inside of the container in the presence of pressurized-air supply.

Container 3 may comprise a stand by which to rest it on the ground and hold it in a substantially vertical position with valve device 18 facing downwards adjacent to the ground. In this way, container 3 may be connected to a generic compressor and maintained in the best position to dispense the sealing liquid by means of the compressed air, while leaving the user's hands free.

Valve device 18 may be provided with a non-return valve along or upstream from axial passage 27c to prevent the sealing liquid from reaching conduit 54 or the delivery side of the compressor along first hose 4, e.g. due to leakage of O-rings 34a, thus damaging the compressor or impairing compressed-air flow by setting hard and partly clogging the conduits.

The invention claimed is:

1. A container (3) for sealing liquid for repairing inflatable articles comprising a vessel (15) having an opening (17) and closing means (18) to close said opening (17), characterized in that said closing means (18) comprise a valve device integrated inside said container (3) and housed into said opening (17), said valve device (18) having an inlet (27c) connectable to a compressed-air feed line (4), and an outlet (29a) for dispensing the sealing liquid; said valve device (18) comprising at least one control member (30) movable, in response to pressurization of said feed line (4), from a closed position closing said valve device (18) and wherein said inlet (27c) and said outlet (29a) are closed from the inside of said container (3) by said control member (30), to an open position wherein said inlet (27c) and said outlet (29a) communicate with the inside of said container (3).

2. A container as claimed in claim 1, characterized in that said valve device (18) comprises elastic means (31) for keeping said control member (30) stably in said closed position in the absence of pressure to said inlet (27c).

3. A kit (1) for repairing and inflating inflatable articles characterized by comprising a container (3) as claimed in claim 1; and a dispenser unit (40) connectable detachably to said container (3) and having an inlet fitting (53) connected in fluid-tight manner to said inlet (27c) of said valve device (18), and an outlet fitting (50) connected in fluid-tight manner to said outlet (29a) of said valve device (18).

4. A kit as claimed in claim 3, characterized in that said dispenser unit (40) screws onto a threaded neck (16) of said container (3) housing said valve device (18).

5. A kit as claimed in claim 4, characterized in that said dispenser unit (40) comprises a cavity (48) housing said neck (16) of said container (3); and said inlet (53) and outlet (50) fittings communicating with a bottom portion (52) of said cavity (48) via an axial conduit (54) and a transverse conduit (51).

6. A kit as claimed claim 3, characterized by comprising a casing (6) housing a compressor assembly (2) and having a seat (7) for housing said container (3) and said dispenser unit (40).

7. A kit as claimed in claim 6, characterized in that said seat (7) comprises a base portion (14) having fastening means (49) for securing said dispenser unit (40) stably but detachably.

8. A kit as claimed in claim 7, characterized in that said fastening means (49) comprise a bayonet connection.

9. A container (3) for sealing liquid for repairing inflatable articles comprising a vessel (15) having an opening (17) and closing means (18) to close said opening (17), characterized in that said closing means (18) comprise a valve device integrated in said container (3) and housed into said opening (17), said valve device (18) having an inlet (27c) connectable to a compressed air feed line (4), and an outlet (29a) for dispensing the sealing liquid;

said valve device (18) comprising at least one control member (30) movable, in response to pressurization of said feed line (4), from a closed position closing said valve device (18) and wherein said inlet (27c) and said outlet (29a) are closed from the inside of said container (3) by said control member (30), to an open position wherein said inlet (27c) and said outlet (29a) communicate with the inside of said container (3);

said valve device (18) further including elastic means (31) for keeping said control member (30) stably in said closed position in the absence of pressure to said inlet (27c) and including a body (19) housed in fluid-tight manner in said opening (17) of said vessel (15) and having at least one first hole (24) and at least one second hole (25) axially spaced apart and communicating with the inside of said container (3); said inlet (27c) and said outlet (29a) being defined by respective axial passages (27c, 29a) of said body (19) which are open outwards of said container (3); said control member being defined by a slide (30) which slides axially in said body (19) and has sealing means (34a, 34b, 35a, 35b) for isolating said first hole (24) and said second hole (25) from said inlet (27c) and from said outlet (29a) in said closed position, and for isolating said first hole (24) from said outlet (29a) and said second hole (25) from said inlet (27c) in said open position.

10. A container as claimed in claim 9, characterized in that said body (19) comprises a lateral wall (20) having said holes (24, 25); and an axial tubular rod (27) defining with the lateral wall an annular chamber (36) along which said slide (30) slides; said axial passages (27a, 29a) defining said inlet (27c) and said outlet (29a) being defined by an axial cavity (27c) of said rod (27) and by at least one axial passage (29a) formed between said rod (27) and said lateral wall (20) of said body (19).

* * * * *